United States Patent
Cao et al.

(10) Patent No.: US 11,620,205 B2
(45) Date of Patent: Apr. 4, 2023

(54) DETERMINING INFLUENCE OF APPLICATIONS ON SYSTEM PERFORMANCE

(71) Applicant: International Business Machines Corporation, Armonk, NY (US)

(72) Inventors: Li Cao, Bei Jing (CN); Xing Xing Shen, Beijing (CN); Zhi Li, Beijing (CN); He Jiang Jia, Beijing (CN); Bo Tong Liu, Beijing (CN); Xiao Dong Li, Beijing (CN); Sheng Jie BJ Han, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 17/073,504

(22) Filed: Oct. 19, 2020

(65) Prior Publication Data

US 2022/0121548 A1    Apr. 21, 2022

(51) Int. Cl.
*G06F 11/34* (2006.01)
*G06F 17/15* (2006.01)

(52) U.S. Cl.
CPC ...... *G06F 11/3428* (2013.01); *G06F 11/3433* (2013.01); *G06F 11/3452* (2013.01); *G06F 11/3466* (2013.01); *G06F 17/15* (2013.01)

(58) Field of Classification Search
CPC ...... G06F 9/5011; G06F 17/15; G06F 11/302; G06F 11/3055; G06F 11/324;
(Continued)

(56) References Cited

U.S. PATENT DOCUMENTS

| 7,966,278 | B1 | 6/2011 | Satish |
| 8,255,902 | B1 | 8/2012 | Satish |
| (Continued) | | | |

FOREIGN PATENT DOCUMENTS

| CN | 107613107 A | 1/2018 |
| CN | 111107429 A | 5/2020 |

OTHER PUBLICATIONS

Authors et. al.: Disclosed Anonymously, "A method and system of performance governance for Cloud Computing based on Event-driven mechanism," IP.com No. IPCOM000240110D;IP.com Electronic Publication Date: Jan. 4, 2015; 7 pages.

(Continued)

*Primary Examiner* — John H Le
(74) *Attorney, Agent, or Firm* — Cantor Colburn LLP; Teddi Maranzano

(57) ABSTRACT

A computer-implemented method for determining influence of applications on system performance includes collecting, by a processor, for several applications that are executing on a computing system, respective instrumentation data during multiple time-segments. The method further includes determining, for each of the applications, a performance value and a robustness value for each of the time-segments based on the respective instrumentation data. Further, using the performance value and robustness value for each time-segment, multiple health-waveforms are generated, where a health-waveform is generated for each respective application. The method further includes determining, by the processor, an influence-factor of a first application on a second application, the first application and the second application are executing on the computing system. The method further includes adjusting, by the processor, allocation of a computer resource by releasing the computer resource from the (Continued)

first application and allocating the computer resource to the second application based on the influence-factor.

25 Claims, 12 Drawing Sheets

(58) Field of Classification Search
    CPC .......... G06F 11/3428; G06F 11/3433; G06F 11/3442; G06F 11/3452; G06F 11/3466; G06F 2201/865
    USPC ..................................................... 702/186
    See application file for complete search history.

(56) References Cited

U.S. PATENT DOCUMENTS

| | | |
|---|---|---|
| 8,340,568 B2 | 12/2012 | Fadel et al. |
| 8,694,983 B1 | 4/2014 | Sobel et al. |
| 9,262,537 B2 | 2/2016 | Kim et al. |
| 9,774,517 B2 | 9/2017 | Wittenstein et al. |
| 2009/0157855 A1 | 6/2009 | Adam et al. |
| 2013/0283102 A1 | 10/2013 | Krajec et al. |
| 2018/0077083 A1 | 3/2018 | Baughman et al. |
| 2019/0057006 A1 | 2/2019 | Boyapalle et al. |
| 2021/0012155 A1* | 1/2021 | Vu ...................... G06F 11/3055 |
| 2021/0149717 A1* | 5/2021 | Li ........................ G06F 9/4881 |

OTHER PUBLICATIONS

International Search Report and Written Opinion; dated Jan. 18, 2022; Application No. PCT/IB2021/059239; Filed: Oct. 8, 2021; 11 pages.

* cited by examiner

DETERMINING INFLUENCE OF APPLICATIONS ON SYSTEM PERFORMANCE

BACKGROUND

The present invention relates in general to computing systems, and particularly to dynamically quantifying influence of applications on the performance of a computing system that is executing the applications, such quantification based on parameters captured during a time segment.

Conventional monitoring systems that monitor parameters that are captured for real-time analytics of a computing system may evaluate real time or near-real time data and compare those data against thresholds, limits, or other metrics to determine whether an error or alert condition may exist. The parameters captured can include real-time analytics of machine generated instrumentation data. When an alert is triggered, some communication may be made to a human administrator who may take corrective action. Such systems tend to be reactive and able to detect when a problem has already occurred.

SUMMARY

According to one or more embodiments of the present invention, a computer-implemented method for determining influence of applications on system performance includes collecting, by a processor, for several applications that are executing on a computing system, respective instrumentation data during multiple time-segments. The method further includes determining, by the processor, for each of the applications, a performance value and a robustness value for each of the time-segments based on the respective instrumentation data. The method further includes generating, by the processor, using the performance value and robustness value for each time-segment, health-waveforms for each respective application that is executing. The method further includes determining, by the processor, an influence-factor of a first application on a second application, the first application and the second application are those being executed. The method further includes adjusting, by the processor, allocation of a computer resource by releasing the computer resource from the first application and allocating the computer resource to the second application based on the influence-factor.

In one or more embodiments of the present invention, generating the health-waveforms includes converting, by the processor, the performance value and robustness value for each time-segment into Polar coordinates, and transforming, by the processor, the Polar coordinates for each of the applications into the respective health-waveform.

In one or more embodiments of the present invention, the influence-factor is determined by computing a Pearson correlation coefficient between a first health-waveform of the first application and a second health-waveform of the second application.

In one or more embodiments of the present invention, determining the influence-factor further comprises identifying crest-points on each of the first health-waveform and the second health-waveform.

In one or more embodiments of the present invention, the influence-factor is calculated as:

$$\rho(f_1, f_2) = \frac{E[(f_1 - \mu_{f_1})(f_2 - \mu_{f_2})]}{\sigma_{f_1} \times \sigma_{f_2}},$$

where, E is the covariance of $f_1$ and $f_2$, $f_1$ is the first health-waveform, $f_2$ is the second health-waveform, $\mu_{f_1}$ the mean of $f_1$, $\mu_{f_2}$ is the mean of $f_2$, $\sigma_{f_1}$ is the standard deviation of $f_1$, and $\sigma_{f_2}$ is the standard deviation of $f_2$.

In one or more embodiments of the present invention, the method further includes, in response to detecting a system failure during execution of the second application, storing execution records associated with the first application in response to the influence-factor exceeding a threshold value, and not storing the execution records of the first application in response to the influence-factor being below the threshold value.

In one or more embodiments of the present invention, the method further includes, in response to detecting a system failure during execution of the second application, analyzing, from execution records of the applications, only execution records that are associated with the first application based on the influence-factor exceeding a threshold value.

According to one or more embodiments of the present invention, a system includes a memory device, and one or more processing units coupled with the memory. The one or more processing units perform a method for determining influence of applications on system performance.

According to one or more embodiments of the present invention, a computer program product comprising a storage device with one or more computer executable instructions stored therein, which when executed by one or more processing units cause the one or more processing units to perform a method for determining influence of applications on system performance.

According to one or more embodiments of the present invention, a computer-implemented method includes collecting, by a processor, for several applications that are executing on a computing system, respective instrumentation data during multiple time-segments. The method further includes determining, by the processor, for each of the applications, a performance value and a robustness value for each of the time-segments based on the respective instrumentation data. The method further includes generating, by the processor, using the performance value and robustness value for each time-segment, health-waveforms for each respective application that is executing. The method further includes determining, by the processor, an influence-factor of a first application on a second application, which are executing. The method further includes in response to detecting a system failure during execution of the second application, analyzing, by the processor, from execution records of the applications, only execution records that are associated with the first application based on the influence-factor exceeding a threshold value.

According to one or more embodiments of the present invention, a computer-implemented method includes collecting, by a processor, for several applications that are executing on a computing system, respective instrumentation data during multiple time-segments. The method further includes determining, by the processor, for each of the applications, a performance value and a robustness value for each of the time-segments based on the respective instrumentation data. The method further includes generating, by the processor, using the performance value and robustness value for each time-segment, health-waveforms for each respective application from those that are executing. The method further includes determining, by the processor, an influence-factor of a first application on a second application. The method further includes, in response to detecting a system failure during execution of the second application, storing, by the processor, execution records associated with the first application in response to the influence-factor exceeding a threshold value, and not storing the execution records of the first application in response to the influence-factor being below the threshold value.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

Figure 1:
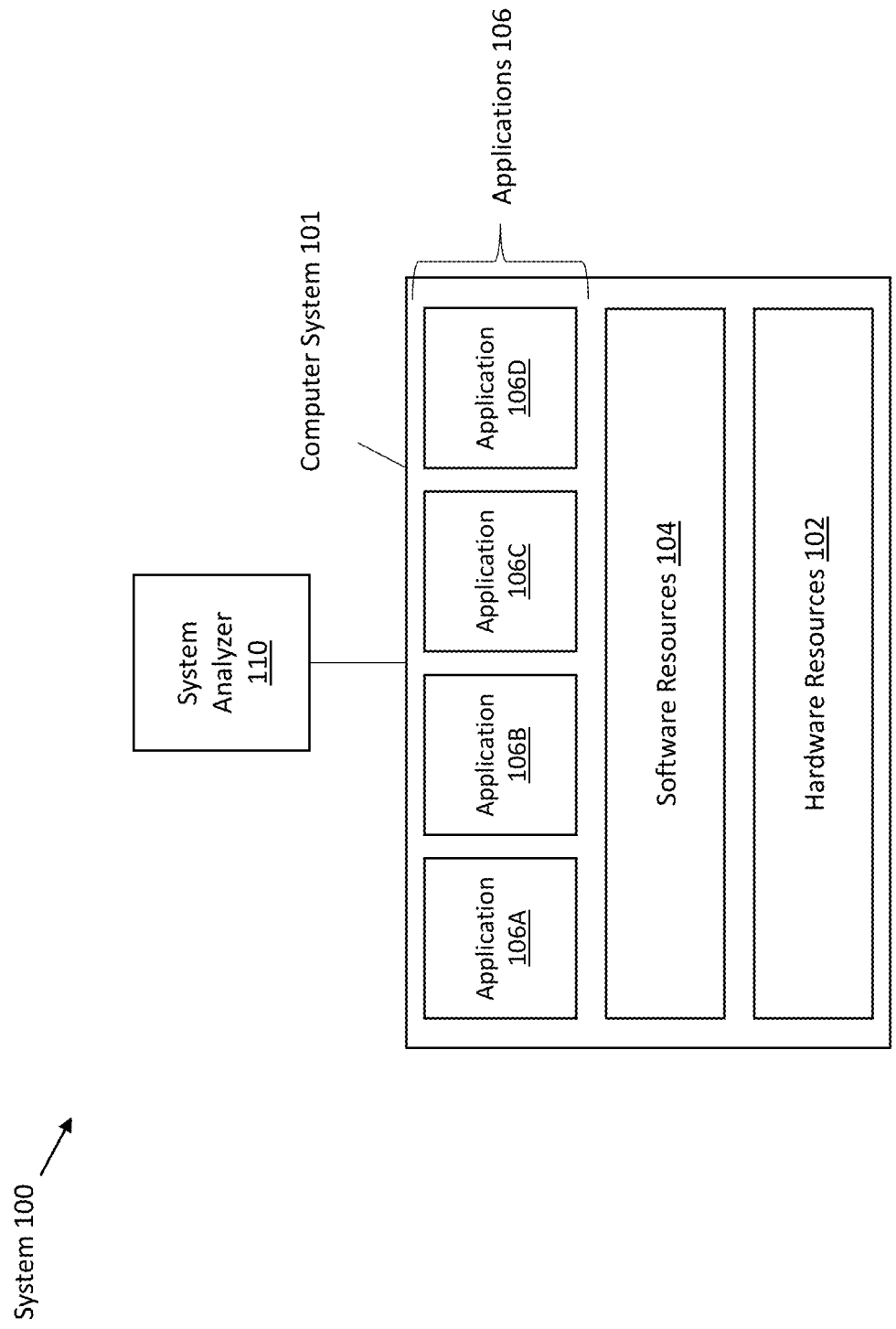
FIG. 1 depicts a block diagram of a system according to one or more embodiments of the present invention.

It should be noted that the drawings herein may not be to scale. In the accompanying figures and following detailed description of the disclosed embodiments, the various elements illustrated in the figures are provided with two, three, or four-digit reference numbers. In most instances, the leftmost digit(s) of each reference number corresponds to the figure in which its element is first illustrated.

DETAILED DESCRIPTION

Embodiments of the present invention facilitate quantitative analysis and measurement of interactive influence of applications executing in a computing system based on incremental performance change of one or more performance parameters of the computing system. The performance parameters can include instrumentation data that quantifies the operation of the computing system. For example, System Management Facility (SMF) is a component of IBM's z/OS® for mainframe computers that provides a standardized method for writing out records of activity to a file, or dataset. SMF provides instrumentation of baseline activities running on an IBM mainframe operating system, including activities such as input/output (I/O), network activity, software usage, error conditions, and processor utilization. SMF forms the basis for many monitoring and automation utilities. It is understood that embodiments of the present invention are not limited to SMF, or IBM z/OS®, rather any technique can be used to capture execution records with performance parameters of a computing system, and those performance parameters can be analyzed as described herein to improve the performance of the computing system. In one or more embodiments of the present invention, the execution records can be analyzed in real-time. Alternatively, or in addition, one or more embodiments of the present invention facilitate determining which execution records are to be stored (and/or which records are not to be stored) to reduce the amount of data stored, as well as reduce time and other resources required to analyze such data. Further, in one or more embodiments of the present invention, the execution records are analyzed offline, after the execution records have been stored.

Technical challenges associated with analyzing performance data of a computing system, particularly in real-time, include analyzing a large amount of such performance data. For example, for each application that is executing the performance data can include parameters such as memory usage, storage usage, paging, processor usage percentage, processor usage time, input/output metrics, network usage, interrupt usage, and any other such instrumentation related data that indicates the usage of computing resources by the application. Further, the performance data also includes performance parameters of several applications (for example, software programs, processes, daemons, etc.) executing on the computing system concurrently. Hence, determining a relationship between the applications is also a technical challenge. Additionally, the performance data is captured at several time segments, at a predetermined frequency, such as, for one minute after every 10 minutes, or for 10 seconds after every 15 minutes, or any other such frequency. Alternatively, or in addition, the performance data can be captured based on events, such as when an application is initiated, or when the application completes execution, or any other such events that are related to execution of one or more applications.

Embodiments of the present invention address such technical challenges with quantifying influence of one application on performance of other application(s) that are executing in the computing system concurrently. In turn, embodiments of the present invention facilitate providing an improved technique to locate a root cause of performance problems in the computing system. For example, when analyzing performance problems, analysts can use the influence-related data to start analyzing the system performance from the highest-influencing applications (leader) during the time segment at which the performance problem was encountered/identified. Further, embodiments of the present invention facilitate predicting future performance of the influenced applications. For example, the performance trend of influencing applications (leader) can be used to predict performance trends of influenced applications (follower). Additionally, embodiments of the present invention facilitate monitoring and predicting system performance health more agilely and efficiently. For example, by facilitating judgment of application influences on a time segment, system management rules do not have to be pre-defined by analysts or system programmers. Rather, the system management can be performed dynamically, thus improving agility. Also, key performance indicators (KPIs) of the system can be dynamically measured during a time segment based on the influence-related data. It is more efficient to observe only the influencers than observer all applications to determine health of the system.

Embodiments of the present invention facilitate judging influence between applications that are being executed on a computer system and further facilitate analyzing the degree of such influence based on incremental system health changes during different time segments to quantify the individual health curve of the system caused by the individual applications.

FIG. 1 depicts a block diagram of a system 100 according to one or more embodiments of the present invention. The system 100 includes a computer system 101 that is monitored and analyzed for any performance related issues by a system analyzer 110. It should be noted that although the system analyzer 110 is depicted as a separate block from the computer system 101, in one or more embodiments of the present invention, the system analyzer 110 can be part of the computer system 101 itself. In other embodiments, the system analyzer 110 can be a separate device from the computer system 101.

The system analyzer 110 performs one or more methods described herein and facilitates determining influence of one or more applications on the system performance as well as on other applications that are executing in the computer system 101. In one or more embodiments of the present invention, the system analyzer 110 can adjust the allocation of one or more resources of the computer system 101 among the applications 106. The system analyzer 110 can also determine which applications among those executing in the computer system 101 can store execution records. Further yet, in one or more embodiments of the present invention, the system analyzer 110 determines which execution records to analyze the performance of the computing system 101. In one or more embodiments of the present invention, the system analyzer 110 diagnoses one or more issues with the computer system 101 using the execution records.

The computer system 101 can be any type of a computing device such as a main-frame computer, a server computer, a desktop computer, a laptop computer, a tablet computer, a phone, a modem, a router, or any other computing system that includes hardware and software. The computer system 101 includes one or more hardware resources 102 such as processors, memory devices, storage disks, communication hardware, graphics processors, digital signal processors, input-output devices, cache memory devices, and so on. The computer system 101 includes one or more software resources 104 such as hypervisors, virtual machines, operating systems, database systems, e-commerce systems, communication systems, artificial intelligence resources, and so on. In one or more embodiments, the hardware resources 102 and the software resources 104 are accessed by one or more applications 106 that are executing on the computer system 101. The hardware resources 102 and the software resources 104 are accessed via respective application programming interfaces provided by the computer system 101.

The applications 106 can include, but are not limited to, web-servers, database access servers, web-browsers, games, media-streaming applications, spreadsheet applications, word-processing applications, mathematical applications, simulation applications, enterprise software applications, or any other types of software applications, Such software applications can be used in any field, for example, but not limited to, mathematical simulation, healthcare, scientific/engineering research, retail, finance, business, etc. FIG. 1 depicts four applications—application-A 106A, application-B 106B, application-C 106C, and application-D 106D that are concurrently executing on the computer system 101. However, it is understood that in other embodiments any other number of applications can be executing concurrently on the computer system 101. Embodiments of the present invention are described herein using examples involving the above mentioned four applications, however, the invention is not limited by such examples.

Figure 2:
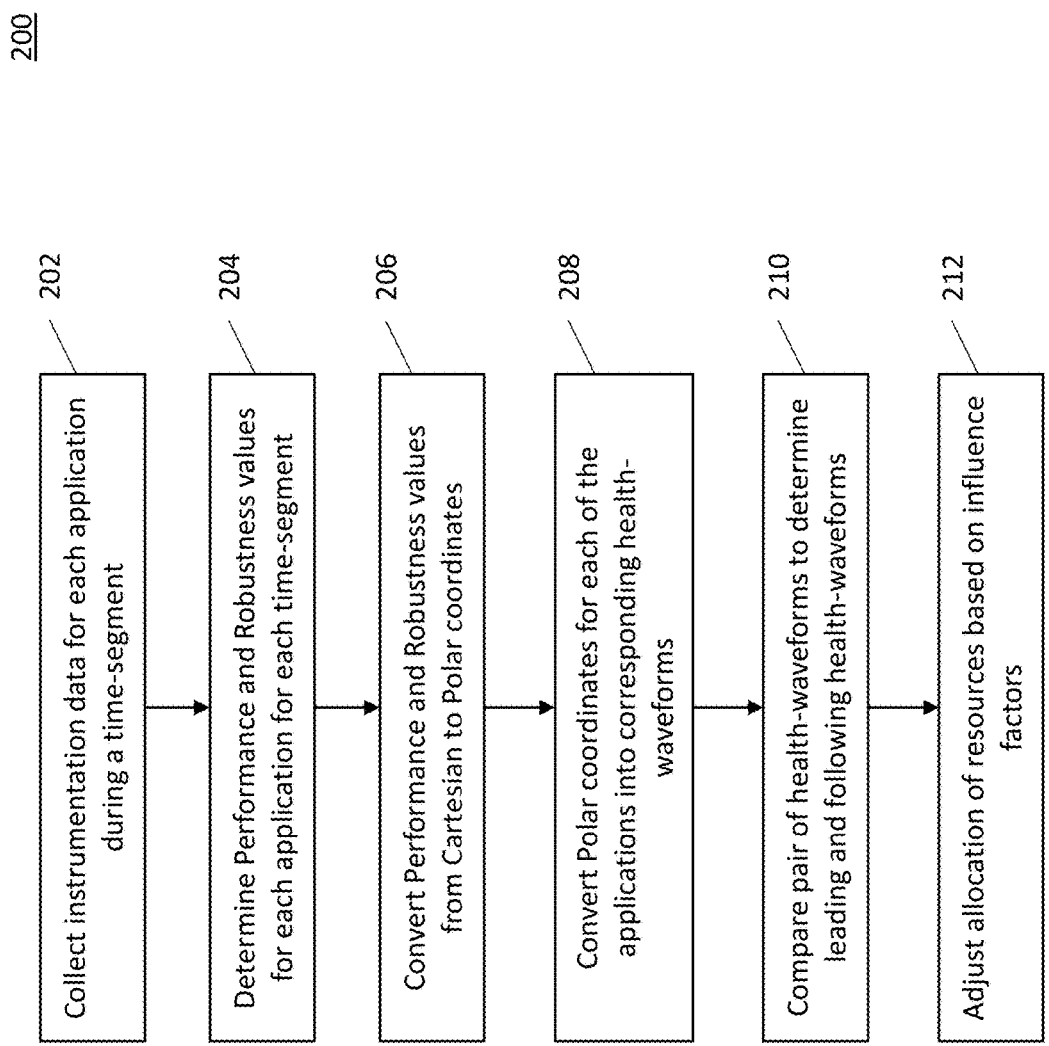
FIG. 2 depicts a flowchart of a method for determining influence of applications on system performance dynamically according to one or more embodiments of the present invention.

FIG. 2 depicts a flowchart of a method 200 for determining influence of applications on system performance dynamically according to one or more embodiments of the present invention. The method 200 includes collecting instrumentation data $X=\{x_1, x_2, x_3, \ldots x_n\}$ for each of the applications 106 during a time-segment, at block 202. The instrumentation data X includes one or more system parameter measurement data $x_i$ such as processor usage, memory usage, storage disk usage, network usage, operating system usage, virtual machine usage, hypervisor usage, and any other parameters that indicate usage of any of the hardware resources 102 and/or the software resources 104.

The time-segment can be a predetermined duration or timepoint at which the performance data is captured. For example, the performance data that is collected (X) can be the data that is observed at a particular timepoint, such as at 10:00 AM, or 11:30 AM, or any other such time. This may be a predetermined timepoint at which the performance data is collected.

Alternatively, the instrumentation data that is collected (X) can be an aggregation of the performance data observed over a particular duration, for example, from a starting point (e.g., 10:00 AM) to an ending point (e.g., 11:00 AM). The starting and ending points can be predetermined or determined dynamically based on the operation of the system 100. The aggregation can be sum, mean, geometric mean, median, maximum, minimum, weighted average, or any other such statistical function or a combination thereof. In other words, the instrumentation data for each of the applications 106 is captured from the starting point to the ending point, one or more statistical operations are performed on the captured data, and the results are then stored as the performance data. In the example scenario with the applications 106A-D, four sets of instrumentation data are collected, $X_A$, $X_B$, $X_C$, and $X_D$, respectively corresponding to the applications 106A-D.

At block 204, performance and robustness (PR) values are predicted for each of the collected instrumentation data X. In a multivariable system, PR predicted value quantifies the impact of uncertainties, and in turn facilitates making an informed decision. The PR predictions also reduce gaps between predicted performance and operational performance. The PR predicted value identifies uncertain influential parameters that impact the performance of the computer system 101. The PR predicted values can facilitate identify the most influential uncertainty sources from the instrumentation data (X) that is collected.

Various PR modeling and predicting techniques are known, and embodiments of the present invention can use any of the known PR modeling and predicting techniques. For example, in an embodiment of the present invention, the PR values are determined using a neural network that receives the instrumentation data X for each of the applications 106. In an embodiment, the neural network is trained using the radial basis function (RBF) to provide the corresponding PR values for each of the applications. Accordingly, PR values are obtained for each, application 106A, 106B, 106C, and 106D, respectively, and for each time segment during which the instrumentation data X is captured.

Figure 3:
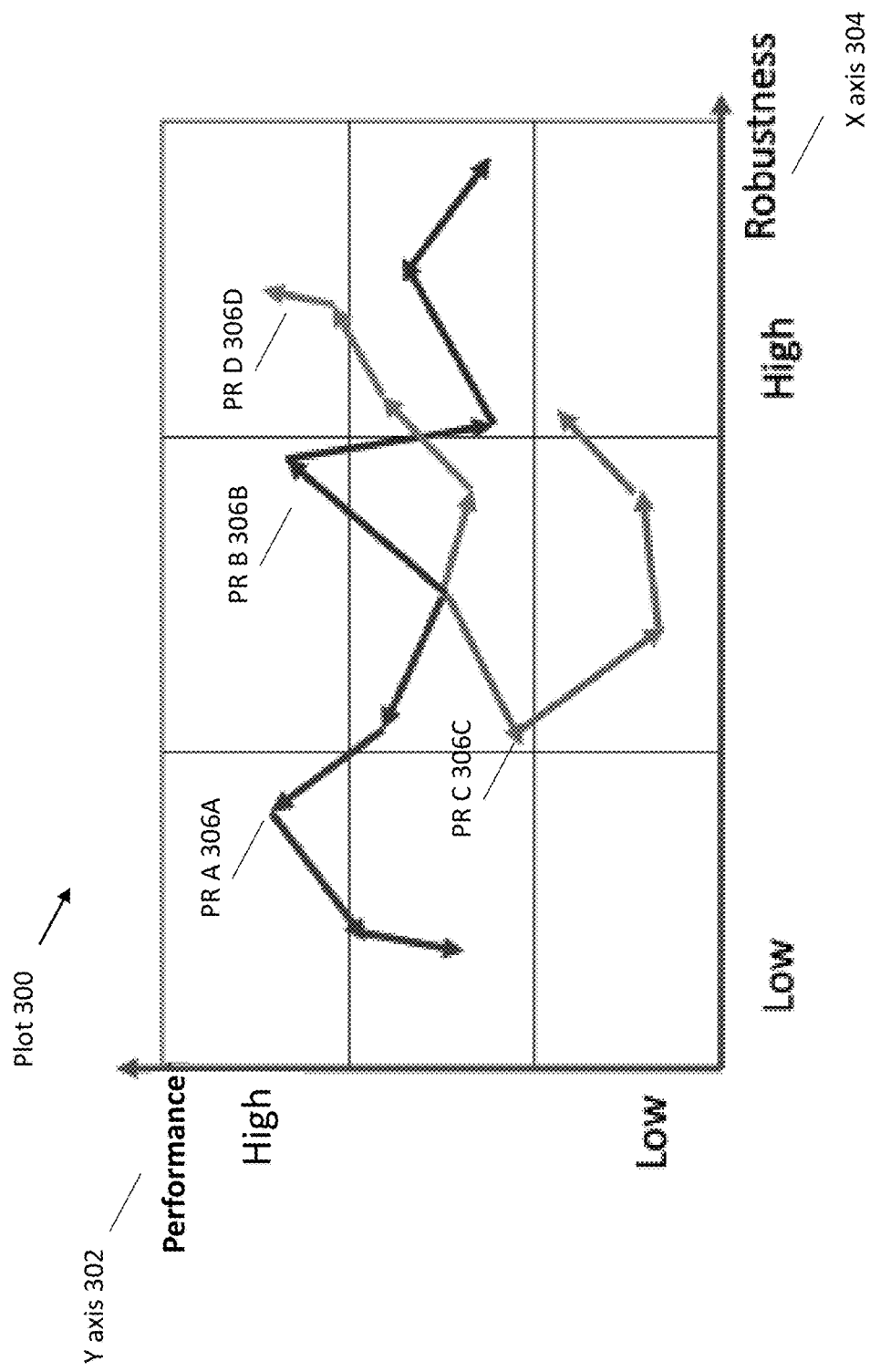
FIG. 3 depicts an example rendition of performance-robustness data for the multiple applications according to one or more embodiments of the present invention.

FIG. 3 depicts an example rendition of the PR data for the multiple applications according to one or more embodiments of the present invention. The performance is plotted along the Y-axis 302 and the robustness is plotted along the X-axis 304 in the depicted plot 300. The plot 300 includes four curves 306A-D corresponding to the applications 106A-D respectively. Each curve 306A, 306B, 306C, and 306D depicts the PR values for the applications 106A, 106B, 106C, and 106D, corresponding to the various time-segments. Each time-segment is represented as an arrow (vector) in FIG. 3. Four time-segments per application are represented in FIG. 3, however, different number of time-segments can be analyzed in other embodiments of the present invention.

Figure 4:
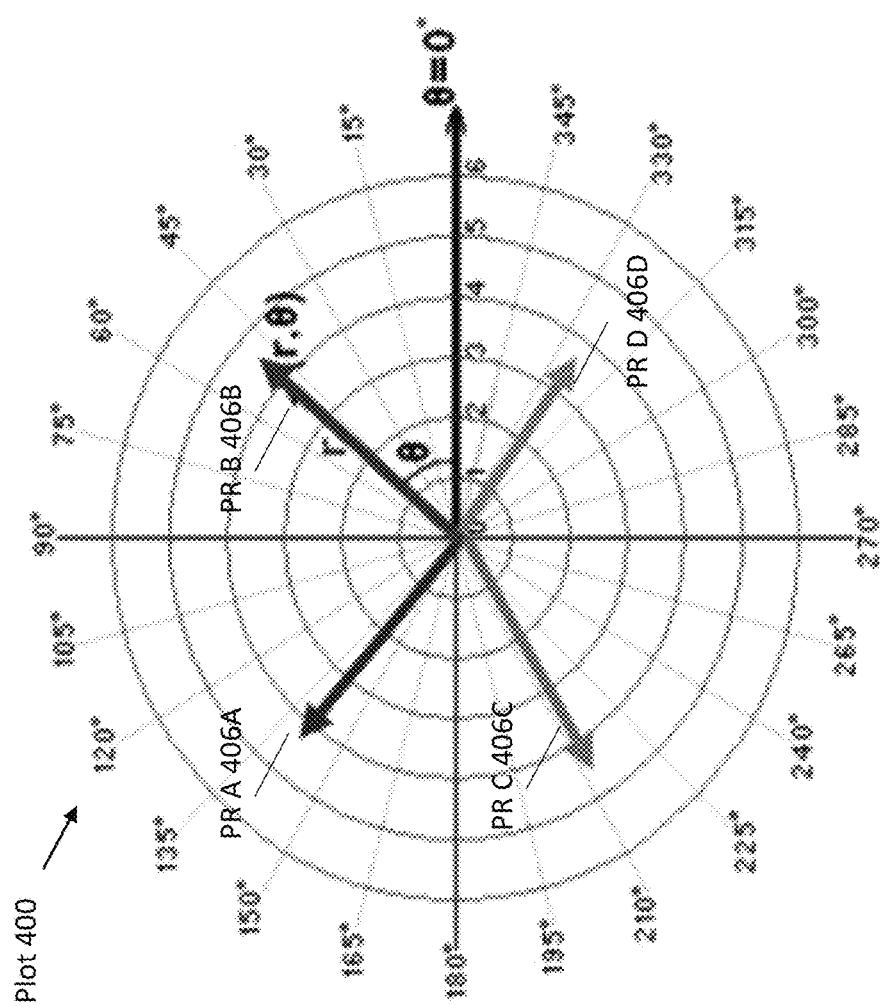
FIG. 4 depicts a plot that depicts the performance-robustness curves in polar coordinates (r, θ) according to one or more embodiments of the present invention.

Referring again to the flowchart in FIG. 2, at block 206, the method 200 includes mapping the PR values to polar coordinates (r, θ). FIG. 4 depicts a corresponding plot 400 that depicts the curves PR-A 306A, PR-B 306B, PR-C 306C, and PR-D 306D, in the polar coordinates (r, θ) according to one or more embodiments of the present invention. Polar coordinates can be calculated from the Cartesian coordinates (P, R) coordinates like:

$$r=(x^2+y^2)^{1/2} \quad (1)$$

Where, r=distance from origin to the point, x=Performance, y=Robustness; and $$\theta = \text{atan}(y/x) \quad (2)$$
$$= \tan^{-1}(y/x)$$

Where, θ=angle relative to the zero axis (degrees).

Figure 5:
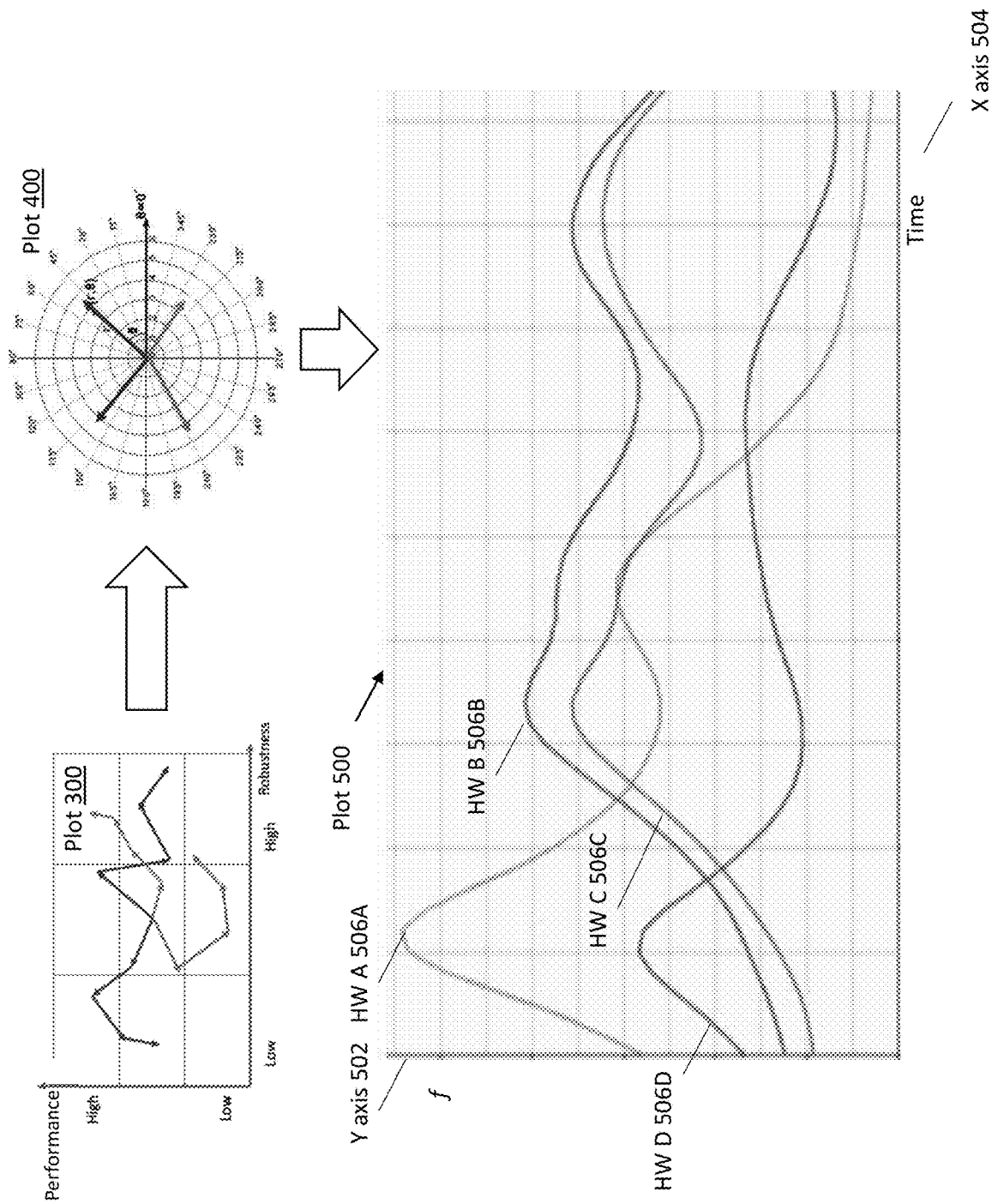
FIG. 5 depicts health-waveforms for the multiple applications according to one or more embodiments of the present invention.

Further, at step 208, the Polar coordinates for each of the applications 106 are converted into corresponding health-waveforms. The health-waveforms represent system performance during execution of the applications 106. The system performance is associated with resource utilization. Accordingly, the health-waveforms represent usage of the resources (102, 104) of the computing system 101 during execution by the applications 106, each waveform representing the usage by the corresponding application. FIG. 5 depicts health-waveforms for the multiple applications according to one or more embodiments of the present invention. The health-waveforms 506A, B, C, D are shown on a plot 500 in Cartesian coordinates with Y-axis 502 and X-axis 504. The Polar coordinates of each of the PR curves 406A-D are transformed into the Cartesian coordinates of the corresponding health-waveforms 506A-D using a dimensionality reduction function:

$$f(r,\theta)=r_t \sin(\theta_t+\theta_0)+a_0 \quad (3)$$

where, t represents time, and $(a_0, \theta_0)$ is the starting point of each vector in the PR curves 406A-D.

As shown in FIG. 5, the plot 500 is obtained from the plot 400, which in turn was obtained from the plot 300. The health-waveforms 506A-D correspond to the PR-curves 306A-D respectively.

Referring to the flowchart in FIG. 2, the method 200 further includes, at block 210, comparing a pair of health-waveforms to detect which of the health-waveforms is leading, and which is following.

Figure 6:
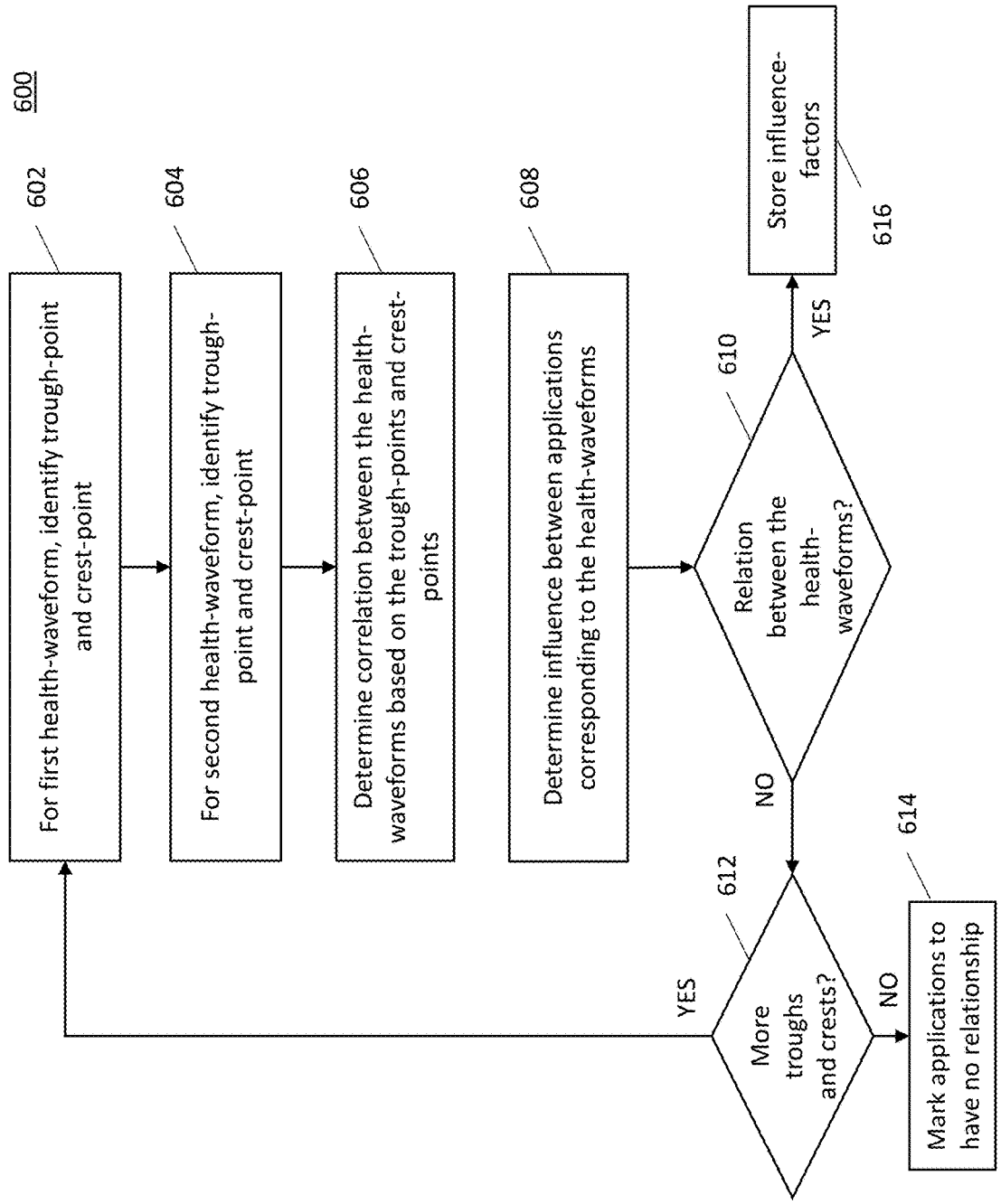
FIG. 6 depicts a flowchart of a method for comparing two health-waveforms according to one or more embodiments of the present invention.
Figure 7:
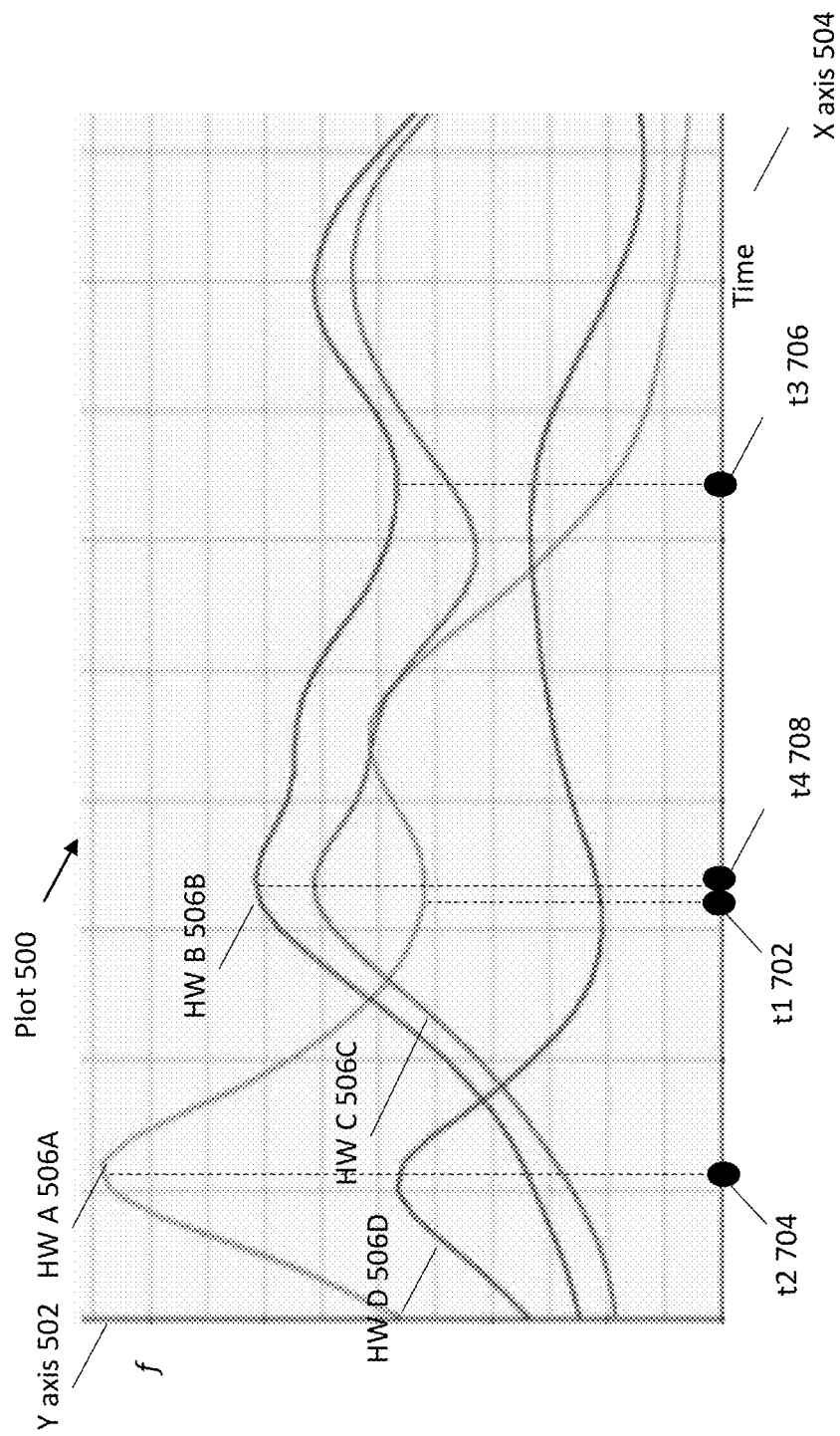
FIG. 7 depicts a visual depiction of comparison of health-waveforms with reference to the plot in FIG. 5 according to one or more embodiments of the present invention.

FIG. 6 depicts a flowchart of a method 600 for comparing two health-waveforms according to one or more embodiments of the present invention. FIG. 7 depicts a visual depiction of the comparison with reference to the plot 500. Consider that the pair of health-waveforms being compared are the HW-A 506A, and the HW-B 506B.

At block 602, for first health-waveform (HW-A 506A), a first crest-point (t2) and a first trough-point (t1) are identified. The trough-point in a health-waveform is identified by determining a timepoint (t1 702) (X-axis) that has a value of f (value at t1=$f_{t1}(r_{t1}, \theta_{t1})$), and at which at least a threshold number of successive previous points have continuously decreasing value of f, and at least the threshold number of subsequent points have continuously increasing value of f. In FIG. 7, t1 702 is a minimum-point or a trough-point on the HW-A 506A.

The crest-point in a health-waveform is identified by determining a timepoint (t2 704) (X-axis) that has a value of f (value at t2=$f_{t2}(r_{t2}, \theta_{t2})$), and at which at least the threshold number of successive previous points have continuously increasing value of f, and at least the threshold number of subsequent points have continuously decreasing value of f. In FIG. 7, t2 704 is a maximum-point or a crest-point on the HW-A 506A.

The threshold number of points used to determine the trough-point and crest-point can be a predetermined value. Alternatively, or in addition, the threshold number of points can be dynamically configured based on the number of points in the health-waveform. In one or more embodiments of the present invention, the threshold number of points for a first health-waveform (e.g., HW-A 506A) can be different from the threshold number of points used for a second health-waveform (e.g., HW-B 506B).

Further, at bock 604, a trough-point and a crest-point are detected for the second health-waveform that is being compared. In FIG. 7, the trough-point t3 706 and a crest-point t4 708 on the HW-B 506B are shown.

At block 606, a correlation between the two health-waveforms being compared is determined based on the trough-points and crest-points. For example, if the difference between t1 and t2 is within a predetermined threshold of a difference between t3 and t4, the two health-waveforms may be deemed to have a leader-follower relationship. The correlation can be determined based on other techniques in other embodiments.

In the example scenario depicted in FIG. 7, it can be seen that HW A 306A leads the HW D 306D, with the two health-waveforms having very similar timing of the crest-points and trough-point. Similarly, HW C 306C follows closely the HW B 306B health-waveform.

At block 608, influence between the applications corresponding to the two health-waveforms being compared is determined based on the trough-points and the crest-points. For example, the influence is determined by computing a pair of influence-factors between the two corresponding applications by computing a Pearson Correlation Coefficient (PCC):

$$\rho(f_1(t_1 < t < t_2), f_2(t_3 < t < t_4)) = \frac{E[(f_1 - \mu_{f_1})(f_2 - \mu_{f_2})]}{\sigma_{f_1} \times \sigma_{f_2}}$$

Where, $\mu_{f_1}$ is a mean of $f_1$, $\mu_{f_2}$ is a mean of $f_2$, $\sigma_{f_1}$ is a standard deviation of $f_1$, $\sigma_{f_2}$ is a standard deviation of $f_2$, and E is an expected value of a random variable, in this case of $(f_1-\mu_{f_1})$ $(f_2-\mu_{f_2})$. In the above formula, the numerator E is a covariance of $f_1$ and $f_2$.

For example, the influence-factors between the application 106A and the application 106B is computed using the trough-points t1 702, t3 706, and the crest-points t2 704, t4 708. It should be noted an influence-factor is directional, i.e., the influence-factor of the application 106A on the application 106B is different from the influence-factor of the application 106B on the application 106A.

Figure 8:
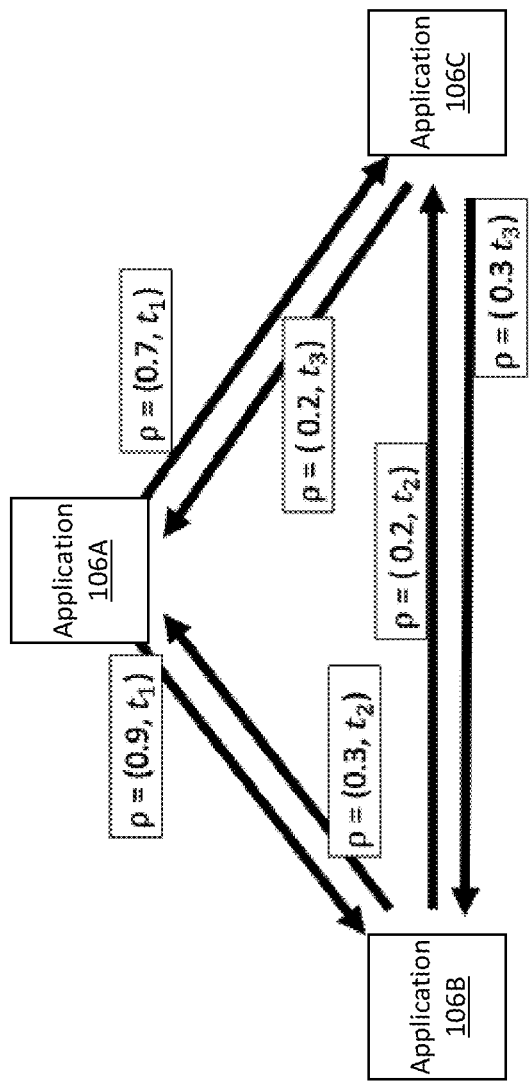
FIG. 8 depicts influence-factors computed between pairs of applications according to one or more embodiments of the present invention.

FIG. 8 depicts influence-factors computed between pairs of applications according to one or more embodiments of the present invention. It is understood that although the influence-factors between applications 106A, 106B, and 106C are depicted, influence-factors between other possible combinations of the applications 106 can be computed. It is also understood that the influence-factors that are depicted are example values, and that in other embodiments, the influence-factor values can vary.

Referring back to the flowchart in FIG. 6, the computed influence-factors are used to determine if a correlation exists between the applications, at block 610. For example, if at least one of the influence-factors between the two applications is below (or above) a predetermined threshold, it can be deemed that a leader-follower relationship does not exist between the two applications corresponding to the health-waveforms being compared. In such a case, the method further includes determining if additional trough-points and crest-points exist in the two health-waveforms being compared, at block 612. If additional troughs and crests exist, the above described operations can be repeated for additional trough-points and crest-points. If additional troughs and crests do not exist, the two applications are marked as not having any influencing relationship, at block 614, and other applications are analyzed using the method 200.

Alternatively, at block 610, if a relationship is identified, the influence-factors between the two applications are stored, at block 616.

In this manner, influence of a first application (e.g., 106A) on the other applications that are concurrently executing in the computing system 101 is determined. Also, the influence of each of the other applications on the first application is also determined. The influence of the application on a second application is represented by the influence-factor of the first application on the second application. A relationship between the first application and the second application is represented by the pair of influence-factors between the two applications.

Referring back to the flowchart in FIG. 2, at block 212, the influence-factors are used to adjust allocation of the hardware resources 102 and the software resources 104 from the computing system 101. For example, as can be seen from FIG. 7, the application 106A uses maximum resources at t2 704, uses minimum resources at t1 702, and the application 106B uses maximum resources at t4 708, t2 704, t1 702, and t4 708 occurring in that order. Accordingly, at least some of the resources that were being used by the application 106A can be released (deallocated) after t2 704 and allocated to the application 106B in anticipation of t4 708.

Alternatively, or in addition, at substantially time t4 708, both, the application 106B and the application 106C, have their respective crest-points. Accordingly, both applications are using maximum resources substantially at the same time. Accordingly, resource allocation can be adjusted so that at least some of the resources from the applications 106A and 106C are released and allocated to the applications 106B and 106D. Other adjustments of the resource allocation can also be performed.

Resources that are allocated and released can include, but not limited to, memory, cache, processor, software licenses (APIs), and any other hardware resources 102 and/or software resources 104. Such resource allocation adjustments can be performed dynamically, i.e., at run-time, improving the performance of the applications 106 and, in turn, the performance of the computing system 101.

Figure 9:
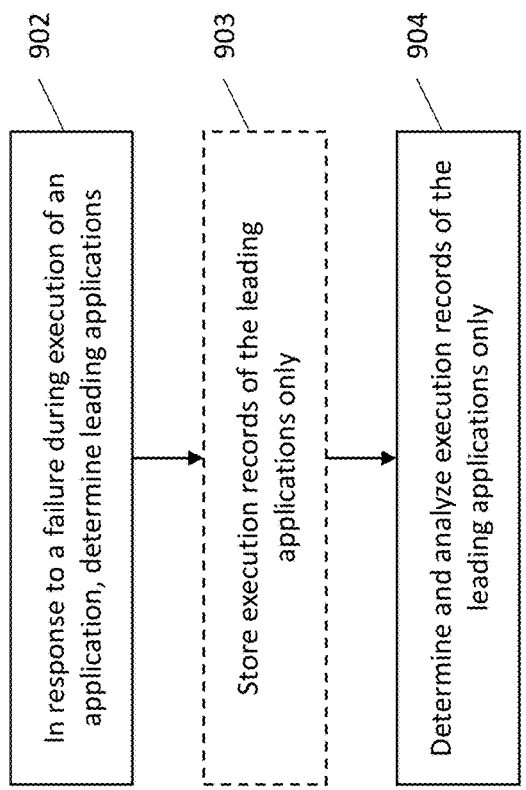
FIG. 9 depicts a flowchart of a method for diagnosing a system failure according to one or more embodiments of the present invention.

In addition, in case of a system failure, such as a resource congestion, deadlock, or any other type of failure, a diagnosis can be performed using the influence-factors. FIG. 9 depicts a flowchart of a method 900 for diagnosing a system failure according to one or more embodiments of the present invention. Consider that the computing system 101 experiences a failure during execution of the application 106D. As shown in FIG. 9, the method 900 includes, determining a set of leading applications of the application that experienced a failure, in this case the application 106D, at block 902. The set of leading applications includes only the applications that have at least a predetermined threshold value of influence-factor on the application 106D. Accordingly, the application 106A is in the set of the leading applications for the application 106D only if the influence-factor of the application 106A on the application 106D is at least the predetermined threshold value.

In an embodiment, at block 903, only the applications from the set of leading applications store their execution records for such analysis. The execution records can include a system dump, an execution log, or any other type of execution records provided by the applications 106. Accordingly, by reducing the number of applications that store their execution records, the amount of time as well as amount of storage space required by the execution records can be reduced, and hence improved.

Further, at block 904, only the execution records of the applications in the set of leading applications are analyzed. Even if all of the applications 106 store their execution records, instead of analyzing the execution of all concurrently executing applications 106, only the execution records of the applications from the set of leading applications are analyzed. Accordingly, efficiency of diagnosing the failure incident can be improved. The analysis can be performed manually or automatically.

Embodiments of the present invention provide a practical application to improve the performance of computing systems. Embodiments of the present invention facilitate improving diagnosing a root cause of performance problems of the computing system by reducing the amount of data that has to be stored and/or analyzed for such diagnosis. Embodiments of the present invention also facilitate predicting the performance of one or more applications that are executing on the system, and further adjust allocation of computing resources (hardware and/or software) accordingly. Further yet, embodiments of the present invention facilitate monitoring and predicting system health in a more agile and efficient manner compared to existing techniques. Based on one or more influence-factors, embodiments of the present invention can facilitate identifying what applications are to be monitored, instead of monitoring all of the applications. Further, KPI of the system can be dynamically measured per time-segment based on the influence-factors, and only those associated with the leading applications can be monitored, thus, reducing amount of data to be monitored, improving efficiency.

Figure 10:
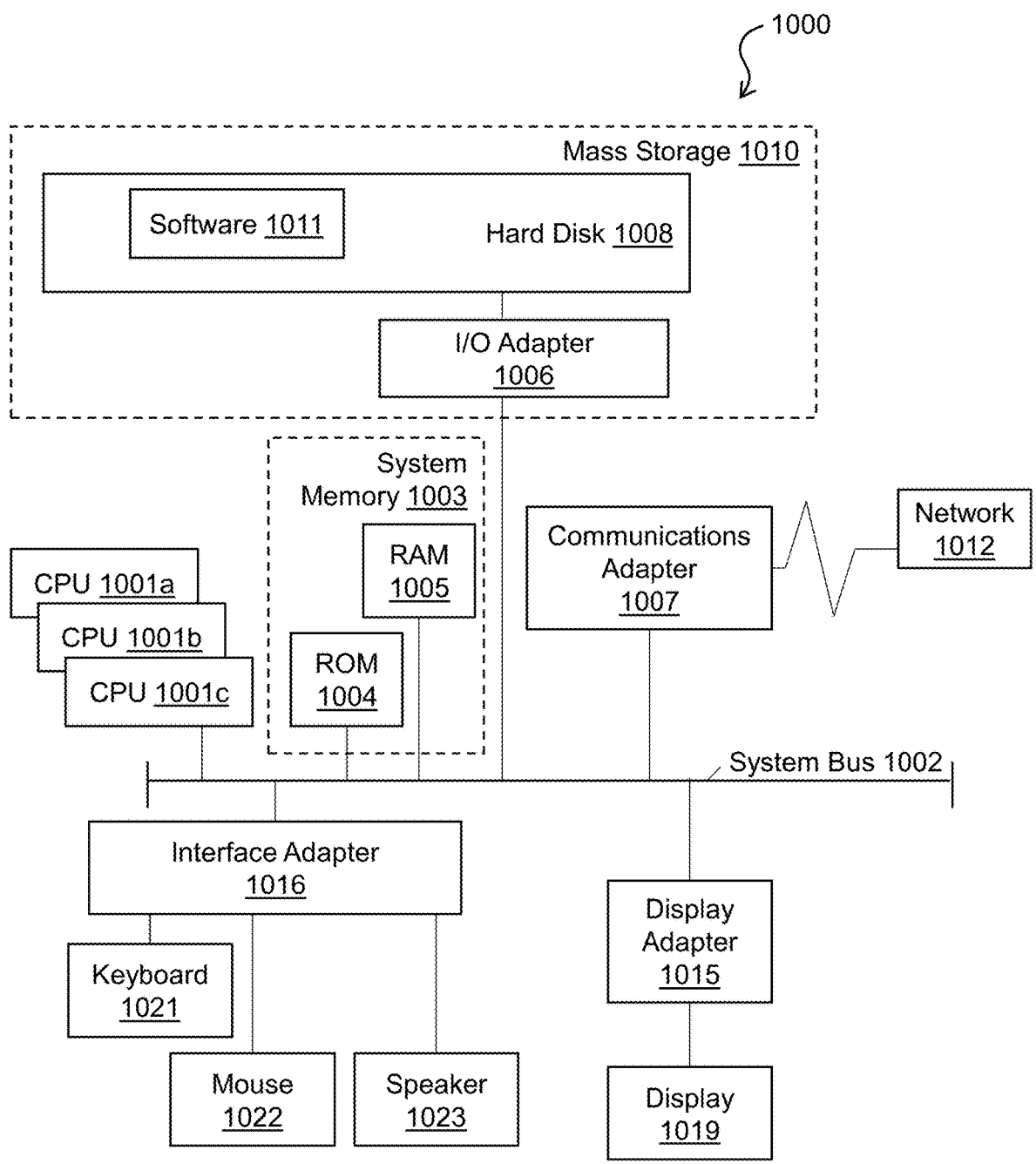
FIG. 10 depicts a computer system in accordance with an embodiment.

Turning now to FIG. 10, a computer system 1000 is generally shown in accordance with an embodiment. The computer system 1000 can be the computing system 101 in one or more embodiments of the present invention. Alternatively, or in addition, the computer system 1000 can be the system analyzer 110 in one or more embodiments of the present invention. The computer system 1000 can be an electronic, computer framework comprising and/or employing any number and combination of computing devices and networks utilizing various communication technologies, as described herein. The computer system 1000 can be easily scalable, extensible, and modular, with the ability to change to different services or reconfigure some features independently of others. The computer system 1000 may be, for example, a server, desktop computer, laptop computer, tablet computer, or smartphone. In some examples, computer system 1000 may be a cloud computing node. Computer system 1000 may be described in the general context of computer system executable instructions, such as program modules, being executed by a computer system. Generally, program modules may include routines, programs, objects, components, logic, data structures, and so on that perform particular tasks or implement particular abstract data types. Computer system 1000 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system 1000 has one or more central processing units (CPU(s)) 1001a, 1001b, 1001c, etc. (collectively or generically referred to as processor(s) 1001). The processors 1001 can be a single-core processor, multi-core processor, computing cluster, or any number of other configurations. The processors 1001, also referred to as processing circuits, are coupled via a system bus 1002 to a system memory 1003 and various other components. The system memory 1003 can include a read only memory (ROM) 1004 and a random-access memory (RAM) 1005. The ROM 1004 is coupled to the system bus 1002 and may include a basic input/output system (BIOS), which controls certain basic functions of the computer system 1000. The RAM is read-write memory coupled to the system bus 1002 for use by the processors 1001. The system memory 1003 provides temporary memory space for operations of said instructions during operation. The system memory 1003 can include random access memory (RAM), read only memory, flash memory, or any other suitable memory systems.

The computer system 1000 comprises an input/output (I/O) adapter 1006 and a communications adapter 1007 coupled to the system bus 1002. The I/O adapter 1006 may be a small computer system interface (SCSI) adapter that communicates with a hard disk 1008 and/or any other similar component. The I/O adapter 1006 and the hard disk 1008 are collectively referred to herein as a mass storage 1010.

Software 1011 for execution on the computer system 1000 may be stored in the mass storage 1010. The mass storage 1010 is an example of a tangible storage medium readable by the processors 1001, where the software 1011 is stored as instructions for execution by the processors 1001 to cause the computer system 1000 to operate, such as is described herein below with respect to the various Figures. Examples of computer program product and the execution of such instruction is discussed herein in more detail. The communications adapter 1007 interconnects the system bus 1002 with a network 1012, which may be an outside network, enabling the computer system 1000 to communicate with other such systems. In one embodiment, a portion of the system memory 1003 and the mass storage 1010 collectively store an operating system, which may be any appropriate operating system, such as the z/OS or AIX operating system from IBM Corporation, to coordinate the functions of the various components shown in FIG. 10.

Additional input/output devices are shown as connected to the system bus 1002 via a display adapter 1015 and an interface adapter 1016 and. In one embodiment, the adapters 1006, 1007, 1015, and 1016 may be connected to one or more I/O buses that are connected to the system bus 1002 via an intermediate bus bridge (not shown). A display 1019 (e.g., a screen or a display monitor) is connected to the system bus 1002 by a display adapter 1015, which may include a graphics controller to improve the performance of graphics intensive applications and a video controller. A keyboard 1021, a mouse 1022, a speaker 1023, etc. can be interconnected to the system bus 1002 via the interface adapter 1016, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 10, the computer system 1000 includes processing capability in the form of the processors 1001, and, storage capability including the system memory 1003 and the mass storage 1010, input means such as the keyboard 1021 and the mouse 1022, and output capability including the speaker 1023 and the display 1019.

In some embodiments, the communications adapter 1007 can transmit data using any suitable interface or protocol, such as the internet small computer system interface, among others. The network 1012 may be a cellular network, a radio network, a wide area network (WAN), a local area network (LAN), or the Internet, among others. An external computing device may connect to the computer system 1000 through the network 1012. In some examples, an external computing device may be an external webserver or a cloud computing node.

It is to be understood that the block diagram of FIG. 10 is not intended to indicate that the computer system 1000 is to include all of the components shown in FIG. 10. Rather, the computer system 1000 can include any appropriate fewer or additional components not illustrated in FIG. 10 (e.g., additional memory components, embedded controllers, modules, additional network interfaces, etc.). Further, the embodiments described herein with respect to computer system 1000 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
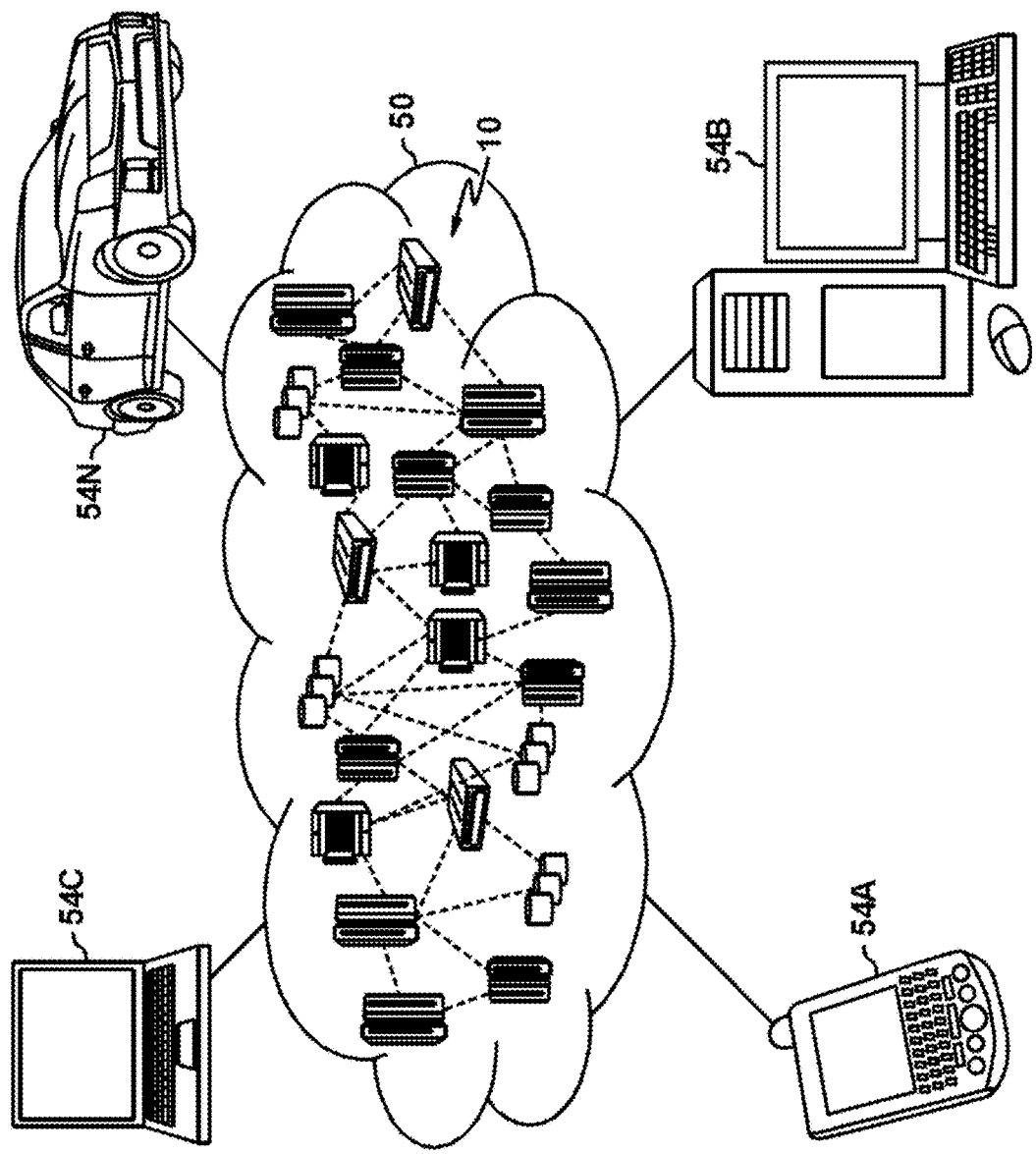
FIG. 11 depicts a cloud computing environment according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
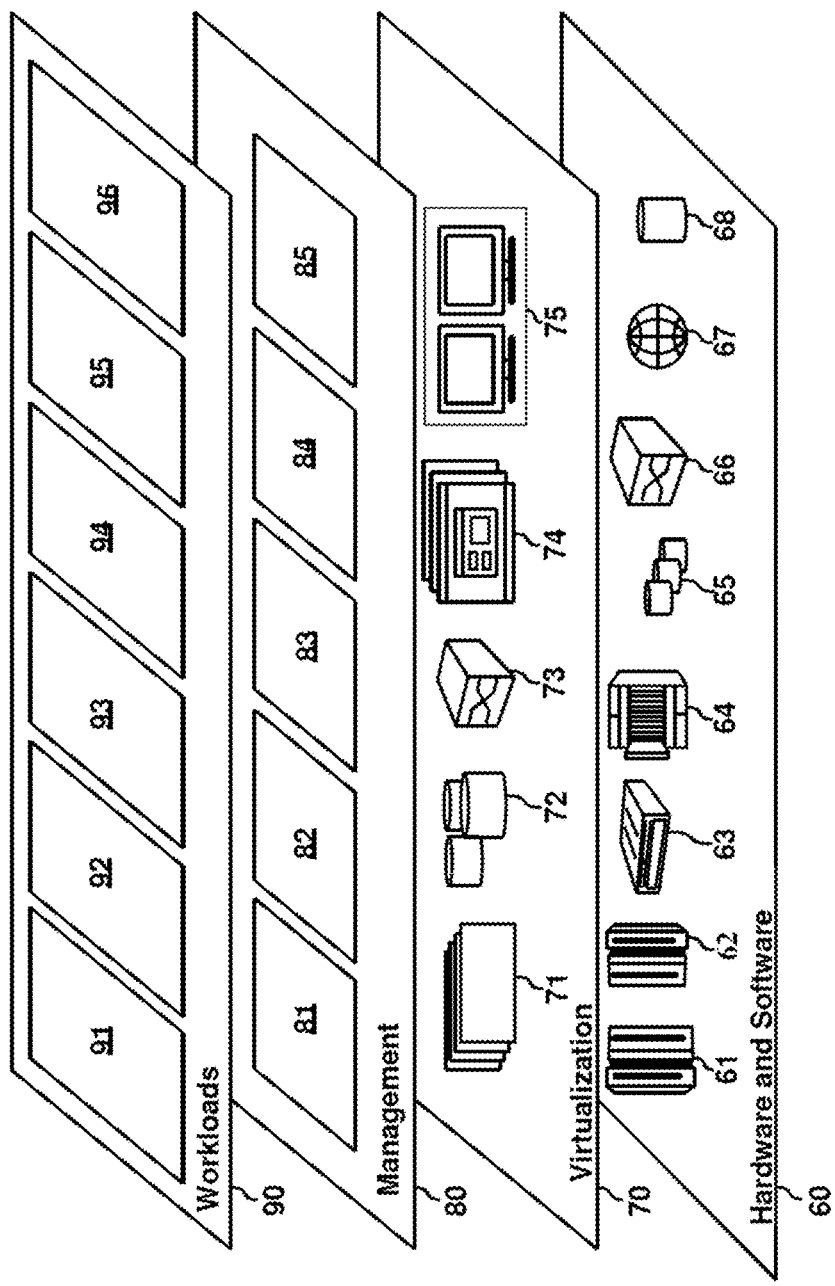
FIG. 12 depicts abstraction model layers according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and system performance analysis 96.

In the present description, the terms "computer program medium," "computer usable medium," "computer program product," and "computer readable medium" are used to generally refer to media such as memory. Computer programs (also called computer control logic) are stored in memory. Such computer programs, when run, enable the computer system to perform the features of the present invention as discussed herein. In particular, the computer programs, when run, enable the controller to perform the features and operations described herein. Accordingly, such computer programs can controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, comprise the module and achieve the stated purpose for the module.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication, "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method for determining an influence of applications on system performance, the method comprising:
   collecting, by a processor, for a plurality of applications that are executing on a computing system, respective instrumentation data during a plurality of time-segments;
   determining, by the processor, for each of the applications, a performance value and a robustness value for each of the time-segments based on the respective instrumentation data;
   generating, by the processor, using the performance value and robustness value for each time-segment, a plurality of health-waveforms comprising a health-waveform for each respective application from the plurality of applications;
   determining, by the processor, an influence-factor of a first application on a second application, wherein the first application and the second application are from the plurality of applications;
   adjusting, by the processor, allocation of a computer resource by releasing the computer resource from the first application and allocating the computer resource to the second application based on the influence-factor; and
   in response to detecting a system failure during execution of the second application, storing, by the processor, execution records associated with the first application in response to the influence-factor exceeding a threshold value, and not storing the execution records of the first application in response to the influence-factor being below the threshold value.

2. The computer-implemented method of claim 1, wherein generating the health-waveforms comprises:
   converting, by the processor, the performance value and robustness value for each time-segment into Polar coordinates;
   transforming, by the processor, the Polar coordinates for each of the applications into the respective health-waveform.

3. The computer-implemented method of claim 1, wherein the influence-factor is determined by computing a Pearson correlation coefficient between a first health-waveform of the first application and a second health-waveform of the second application.

4. The computer-implemented method of claim 3, wherein determining the influence-factor further comprises identifying crest-points on each of the first health-waveform and the second health-waveform.

5. The computer-implemented method of claim 3, wherein the influence-factor is calculated as:

$$\rho(f_1, f_2) = \frac{E[(f_1 - \mu_{f_1})(f_2 - \mu_{f_2})]}{\sigma_{f_1} \times \sigma_{f_2}}$$

Where, E is a covariance of $f_1$ and $f_2$, $f_1$ is the first health-waveform, $f_2$ is the second health-waveform, $\mu_{f_1}$ is a mean of is a mean of $f_1$, $\mu_{f_2}$ is a mean of $f_2$, $\sigma_{f_1}$ is a standard deviation of $f_1$, and $\sigma_{f_2}$ is a standard deviation of $f_2$.

6. The computer-implemented method of claim 1, further comprising, in response to detecting a system failure during execution of the second application, storing execution records associated with the first application in response to the influence-factor exceeding a threshold value, and not storing the execution records of the first application in response to the influence-factor being below the threshold value.

7. The computer-implemented method of claim 1, further comprising, in response to detecting a system failure during execution of the second application, analyzing, from execution records of the plurality of applications, only execution records that are associated with the first application based on the influence-factor exceeding a threshold value.

8. A system comprising:
   a memory device; and
   one or more processing units coupled with the memory, the one or more processing units configured to perform a method for determining an influence of applications on system performance, the method comprising:
      collecting, by a processor, for a plurality of applications that are executing on a computing system, respective instrumentation data during a plurality of time-segments;

determining for each of the applications, a performance value and a robustness value for each of the time-segments based on the respective instrumentation data;

generating, using the performance value and robustness value for each time-segment, a plurality of health-waveforms comprising a health-waveform for each respective application from the plurality of applications;

determining an influence-factor of a first application on a second application, wherein the first application and the second application are from the plurality of applications adjusting allocation of a computer resource by releasing the computer resource from the first application and allocating the computer resource to the second application based on the influence-factor; and in response to detecting a system failure during execution of the second application, storing, by the processor, execution records associated with the first application in response to the influence-factor exceeding a threshold value, and not storing the execution records of the first application in response to the influence-factor being below the threshold value.

9. The system of claim 8, wherein generating the health-waveforms comprises:
converting the performance value and robustness value for each time-segment into Polar coordinates;
transforming the Polar coordinates for each of the applications into the respective health-waveform.

10. The system of claim 8, wherein influence-factor is determined by computing a Pearson correlation coefficient between a first health-waveform of the first application and a second health-waveform of the second application.

11. The system of claim 10, wherein determining the influence-factor comprises identifying crest-points on each, the first health-waveform and the second health-waveform.

12. The system of claim 10, wherein the influence-factor is calculated as:

$$\rho(f_1, f_2) = \frac{E[(f_1 - \mu_{f_1})(f_2 - \mu_{f_2})]}{\sigma_{f_1} \times \sigma_{f_2}}$$

Where, E is a covariance of $f_1$ and $f_2$, $f_1$ is the first health-waveform, $f_2$ is the second health-waveform, $\mu_{f_1}$ is a mean of is a mean of $f_1$, $\mu_{f_2}$ is a mean of $f_2$, $\sigma_{f_1}$ is a standard deviation of $f_1$, and $\sigma_{f_2}$ is a standard deviation of $f_2$.

13. The system of claim 8, wherein the method further comprises, in response to detecting a system failure during execution of the second application, storing execution records associated with the first application in response to the influence-factor exceeding a threshold value, and not storing the execution records of the first application in response to the influence-factor being below the threshold value.

14. The system of claim 8, wherein the method further comprises, in response to detecting a system failure during execution of the second application, analyzing, from execution records of the plurality of applications, only execution records that are associated with the first application based on the influence-factor exceeding a threshold value.

15. A computer readable medium embodying a computer program product, the computer program product comprising a storage device with one or more computer executable instructions stored therein, which when executed by one or more processing units cause the one or more processing units to perform a method for determining an influence of applications on system performance, the method comprising:

collecting, by a processor, for a plurality of applications that are executing on a computing system, respective instrumentation data during a plurality of time-segments;

determining for each of the applications, a performance value and a robustness value for each of the time-segments based on the respective instrumentation data;

generating, using the performance value and robustness value for each time-segment, a plurality of health-waveforms comprising a health-waveform for each respective application from the plurality of applications;

determining an influence-factor of a first application on a second application, wherein the first application and the second application are from the plurality of applications;

adjusting allocation of a computer resource by releasing the computer resource from the first application and allocating the computer resource to the second application based on the influence-factor; and in response to detecting a system failure during execution of the second application, storing, by the processor, execution records associated with the first application in response to the influence-factor exceeding a threshold value, and not storing the execution records of the first application in response to the influence-factor being below the threshold value.

16. The computer program product of claim 15, wherein generating the health-waveforms comprises:
converting the performance value and robustness value for each time-segment into Polar coordinates;
transforming the Polar coordinates for each of the applications into the respective health-waveform.

17. The computer program product of claim 15, wherein influence-factor is determined by computing a Pearson correlation coefficient between a first health-waveform of the first application and a second health-waveform of the second application.

18. The computer program product of claim 17, wherein determining the influence-factor comprises identifying crest-points on each, the first health-waveform and the second health-waveform.

19. The computer program product of claim 17, wherein the influence-factor is calculated as:

$$\rho(f_1, f_2) = \frac{E[(f_1 - \mu_{f_1})(f_2 - \mu_{f_2})]}{\sigma_{f_1} \times \sigma_{f_2}}$$

Where, E is a covariance of $f_1$ and $f_2$, $f_1$ is the first health-waveform, $f_2$ is the second health-waveform, $\mu_{f_1}$ is a mean of is a mean of $f_1$, $\mu_{f_2}$ is a mean of $f_2$, $\sigma_{f_1}$ is a standard deviation of $f_1$, and $\sigma_{f_2}$ is a standard deviation of $f_2$.

20. The computer program product of claim 15, wherein the method further comprises, in response to detecting a system failure during execution of the second application, storing execution records associated with the first application in response to the influence-factor exceeding a threshold value, and not storing the execution records of the first application in response to the influence-factor being below the threshold value.

21. The computer program product of claim 15, wherein the method further comprises, in response to detecting a system failure during execution of the second application, analyzing, from execution records of the plurality of applications, only execution records that are associated with the first application based on the influence-factor exceeding a threshold value.

22. A computer-implemented method comprising:
collecting, by a processor, for a plurality of applications that are executing on a computing system, respective instrumentation data during a plurality of time-segments;
determining, by the processor, for each of the applications, a performance value and a robustness value for each of the time-segments based on the respective instrumentation data;
generating, by the processor, using the performance value and robustness value for each time-segment, a plurality of health-waveforms comprising a health-waveform for each respective application from the plurality of applications;
determining, by the processor, an influence-factor of a first application on a second application, wherein the first application and the second application are from the plurality of applications; and
in response to detecting a system failure during execution of the second application, analyzing, by the processor, from execution records of the plurality of applications, only execution records that are associated with the first application based on the influence-factor exceeding a threshold value, and storing, by the processor, the execution records associated with the first application in response to the influence-factor exceeding a threshold value, and not storing the execution records of the first application in response to the influence-factor being below the threshold value.

23. The computer-implemented method of claim 22, wherein the influence-factor is calculated as:

$$\rho(f_1, f_2) = \frac{E[(f_1 - \mu_{f_1})(f_2 - \mu_{f_2})]}{\sigma_{f_1} \times \sigma_{f_2}}$$

wherein E is a covariance of $f_1$ and $f_2$, $f_1$ is the first health-waveform, $f_2$ is the second health-waveform, $\mu_{f_1}$ is a mean of is a mean of $f_1$, $\mu_{f_2}$ is a mean of $f_2$, $\sigma_{f_1}$ is a standard deviation of $f_1$, and $\sigma_{f_2}$ is a standard deviation of $f_2$.

24. A computer-implemented method comprising:
collecting, by a processor, for a plurality of applications that are executing on a computing system, respective instrumentation data during a plurality of time-segments;
determining, by the processor, for each of the applications, a performance value and a robustness value for each of the time-segments based on the respective instrumentation data;
generating, by the processor, using the performance value and robustness value for each time-segment, a plurality of health-waveforms comprising a health-waveform for each respective application from the plurality of applications;
determining, by the processor, an influence-factor of a first application on a second application, wherein the first application and the second application are from the plurality of applications; and
in response to detecting a system failure during execution of the second application, storing, by the processor, execution records associated with the first application in response to the influence-factor exceeding a threshold value, and not storing the execution records of the first application in response to the influence-factor being below the threshold value.

25. The computer-implemented method of claim 24, wherein the influence-factor is calculated as:

$$\rho(f_1, f_2) = \frac{E[(f_1 - \mu_{f_1})(f_2 - \mu_{f_2})]}{\sigma_{f_1} \times \sigma_{f_2}}$$

wherein E is a covariance of $f_1$ and $f_2$, $f_1$ is the first health-waveform, $f_2$ is the second health-waveform, $\mu_{f_1}$ is a mean of is a mean of $f_1$, $\mu_{f_2}$ is a mean of $f_2$, $\sigma_{f_1}$ is a standard deviation of $f_1$, and $\sigma_{f_2}$ is a standard deviation of $f_2$.

* * * * *